United States Patent [19]

Rittler

[11] Patent Number: 4,461,839
[45] Date of Patent: Jul. 24, 1984

[54] COLORED TRANSPARENT, TRANSLUCENT AND OPAQUE GLASS-CERAMICS

[75] Inventor: Hermann L. Rittler, Corning, N.Y.

[73] Assignee: Corning Glass Works, Corning, N.Y.

[21] Appl. No.: 557,048

[22] Filed: Dec. 1, 1983

Related U.S. Application Data

[63] Continuation-in-part of Ser. No. 451,284, Dec. 20, 1982, abandoned.

[51] Int. Cl.³ ............................................. C03C 3/22
[52] U.S. Cl. ......................................... 501/4; 501/7; 501/68; 501/69; 501/70; 501/71
[58] Field of Search .................. 501/4, 5, 7, 68, 69, 501/70, 71

[56] References Cited

U.S. PATENT DOCUMENTS

| | | | |
|---|---|---|---|
| 3,788,865 | 1/1974 | Babcock et al. | 501/7 |
| 3,907,577 | 9/1975 | Kiefer et al. | 501/7 |
| 3,962,514 | 6/1976 | Rittler | 501/7 |
| 4,007,048 | 2/1977 | Sack et al. | 501/4 |
| 4,042,362 | 8/1977 | MacDowell | 501/4 |
| 4,084,974 | 4/1978 | Beall et al. | 501/7 |
| 4,211,820 | 7/1980 | Cantaloupe et al. | 501/4 |

Primary Examiner—Mark Bell
Attorney, Agent, or Firm—C. S. Janes, Jr.

[57] ABSTRACT

This invention is directed to the production of transparent, translucent, and opaque glass-ceramic articles containing β-quartz solid solution as the predominant crystal phase exhibiting colors ranging from black to brown to red, and opaque glass-ceramic articles containing β-spodumene solid solution as the predominant crystal phase exhibiting colors ranging from gray to brown to almond to beige to yellow to blue. Both types of articles can be prepared by heat treating precursor glass articles essentially free from MgO and consisting essentially, in weight percent, of:

| | | | |
|---|---|---|---|
| $SiO_2$ | 63.5–69 | BaO | 0–5 |
| $Al_2O_3$ | 15–25 | $TiO_2$ | >2.5–6 |
| $Li_2O$ | 2.5–4 | $ZrO_2$ | 0–2 |
| $Na_2O$ | 0.1–0.6 | $As_2O_3$ | 0.4–0.8 |
| $K_2O$ | 0.1–0.6 | $Fe_2O_3$ | 0.05–0.2 |
| ZnO | 0–2 | | | and 0.3–3% total of at least two oxides in the indicated proportions selected from the group of 0–2% CaO, 0–3% $CeO_2$, 0–1% NiO, 0–1.5% $SnO_2$, 0–0.3% $V_2O_5$, and 0–1% $WO_3$. The articles can be made resistant to attack by the atmosphere generated in a coal or wood burning stove by subjecting the surface thereof to an ion exchange reaction where $Li^+$ ions in the crystals are replaced with $K^+$ ions.

4 Claims, No Drawings

COLORED TRANSPARENT, TRANSLUCENT AND OPAQUE GLASS-CERAMICS

This application is a continuation-in-part of application Ser. No. 451,284, filed Dec. 20, 1982, now abandoned.

BACKGROUND OF THE INVENTION

U.S. application Ser. No. 451,283, filed concurrently to Ser. No. 451,284 by me under the title *Transparent Colorless Glass-Ceramics Especially Suitable for Use as Stove Windows*, discloses a relatively narrow range of precursor glass compositions which, although containing $TiO_2$ and up to 0.1% by weight $Fe_2O_3$, can surprisingly be crystallized in situ through heat treatment to yield essentially colorless glass-ceramic articles wherein β-quartz solid solution constitutes the predominant crystal phase. Thus, as is discussed therein, in crystallizing the typical parent glass article containing $TiO_2$ as a nucleating agent and $Fe_2O_3$ as an impurity in amounts greater than 0.01%, a reaction is believed to take place between the titanium and iron ions during the heat treatment process, whereby the valence state of the titanium ions is reduced from +4 to +3. The result of that reaction is the formation of an unattractive gray-brown coloration in the glass-ceramic. The crux of that inventive subject matter lies in the discovery that the essential absence of MgO from the compositions permits the production of virtually colorless, transparent glass-ceramic bodies from precursor glasses containing up to 0.1% $Fe_2O_3$, wherein $TiO_2$ comprised at least a substantial portion of the nucleating agent. And, because β-quartz or β-eucryptite solid solution crystals, as such have been variously denominated, can exhibit coefficients of thermal expansion over the range of 0°–300° C. of 0 or less, those glass-ceramics can demonstrate coefficients of thermal expansion over the same temperature interval within the regime of about −10 to +10×10⁻⁷/°C. Those glass-ceramic articles are produced by heat treating the following glass compositions, expressed in terms of weight percent on the oxide basis, at temperatures between about 750°–950° C.:

| | |
|---|---|
| $SiO_2$ | 65–75 |
| $Li_2O$ | 1–4 |
| $Al_2O_3$ | 15–25 |
| ZnO | 0.5–2 |
| $Na_2O$ and/or $K_2O$ | 0–2 |
| $TiO_2$ | 2–6 |
| $ZrO_2$ | 0–2 |
| BaO | 0–2 |
| F | 0–1.2 |
| $Fe_2O_3$ | >0.01 but <0.1 |

The most preferred composition was stated to have an analyzed composition of about:

| | |
|---|---|
| $SiO_2$ | 66.6% |
| $Al_2O_3$ | 20.5 |
| $Li_2O$ | 3.7 |
| $Na_2O$ | 0.4 |
| $K_2O$ | 0.5 |
| ZnO | 1.0 |
| BaO | 2.0 |
| $TiO_2$ | 2.6 |
| $ZrO_2$ | 1.6 |
| $As_2O_3$ | 0.5 |
| $Fe_2O_3$ | 0.05 |

Those glass-ceramics are described as being especially useful as windows for coal and wood burning stoves since their transparency and lack of color provided an uninterrupted and undistorted view of the fire inside the stove. However, because the precursor glass therefor possesses the thermal stability and viscosity characteristics necessary for forming sheet, coupled with their high refractoriness, excellent chemical durability, very low coefficient of thermal expansion (about ±7×10⁻⁷/°C. over the range of 25°–700° C.), and capability of being crystallized in situ very rapidly, other applications for those glass-ceramics in sheet form such as countertops and range tops have become apparent.

As can be appreciated, not all such applications require a colorless transparent product. Indeed, where a decorative effect is wanted, colors immediately come to mind. (Even in windows for coal and wood burning stoves, there has been some desire voiced for a product having a light brown tint to impart a warm, cheerful appearance to the fire inside.) Furthermore, many applications do not require transparent products. Accordingly, it would be highly desirable to be able to produce transparent and opaque glass-ceramic articles having compositions approximating the analyzed values above, but exhibiting a range of colors.

SUMMARY OF THE INVENTION

Transparent, translucent, and opaque glass-ceramic articles containing β-quartz solid solution as the predominant crystal phase exhibiting colors ranging from black to brown to red, and opaque glass-ceramic articles containing β-spodumene solid solution as the predominant crystal phase exhibiting colors ranging from gray to brown to almond to beige to yellow to blue can be prepared from precursor glasses having base compositions essentially free from MgO consisting essentially, in weight percent, of:

| | |
|---|---|
| $SiO_2$ | 63.5–69 |
| $Al_2O_3$ | 15–25 |
| $Li_2O$ | 2.5–4 |
| $Na_2O$ | 0.1–0.6 |
| $K_2O$ | 0.1–0.6 |
| Zno | 0–2 |
| BaO | 0–5 |
| $TiO_2$ | 2–3 |
| $ZrO_2$ | 0.5–2.5 |
| $As_2O_3$ | 0.4–0.8 |
| $Fe_2O_3$ | 0.05–0.1 |

The desired colors are obtained through the use of a "color package" containing about 0.5–3% $TiO_2$ and up to 0.15% $Fe_2O_3$ with 0.3–3% total of at least two oxides in the indicated proportion selected from the group of up to 0.3% $V_2O_5$, up to 3% $CeO_2$, up to 2% CaO, up to 1% NiO, up to 1% $WO_3$, and up to 1.5% $SnO_2$. The total $TiO_2$ content will range >2.5–6% and the $Fe_2O_3$ content will range 0.05–0.2%.

The means for making the inventive products comprises three general steps:

(a) a batch for a glass having a composition within the above ranges is melted;

(b) the melt is simultaneously cooled to a temperature at least below the transformation range thereof and a glass article of a desired configuration shaped therefrom; and (c) the glass article is heat treated in a manner to cause the crystallization in situ thereof.

Where a glass-ceramic article containing β-quartz solid solution as the predominant crystal phase is desired, the precursor glass article will be heat treated at temperatures between about 750°–950° C. for a time sufficient to effect crystallization in situ. Where an article containing β-spodumene solid solution as the predominant crystal phase is desired, the precursor glass article will be heat treated at temperature between about 950°–1150° C. for a time sufficient to cause crystallization in situ.

Each of the above-delineated members of the "color package" displays a tendency to raise the coefficient of thermal expansion of the base composition, especially when heat treated to effect crystallization of beta-spodumene solid solution. To illustrate, the coefficients of thermal expansion of such glass-ceramic bodies can be readily raised from the customary $6-8 \times 10^{-7}/°C$. to $>10 \times 10^{-7}/°C$. (25°–700°) when the coloring oxides are incorporated. Consequently, it is essential that the concentrations of the "color package" ingredients be kept to a minimum, while still obtaining the desired tints, in order to secure the most thermally stable, crystallized articles.

It is possible to offset at least a portion of that increase in thermal expansion by varying the amounts of the components of the base composition. For example, utilizing levels of BaO, CaO, Na$_2$O, K$_2$O, Al$_2$O$_3$, TiO$_2$, and As$_2$O$_3$ at the lower end of the operable ranges thereof, when possible, will reduce the coefficient of thermal expansion of a beta-spodumene solid solution-containing glass-ceramic. Further, the substitution of SnO$_2$ for the combination of CeO$_2$+CaO substantially decreases the thermal expansion of those articles.

Finally, it is possible to make small additions, viz., no more than a total of about 3%, of such oxides as Cu$_2$O, La$_2$O$_3$, B$_2$O$_3$, and Cs$_2$O and the transition metal oxides CoO, MnO, Cr$_2$O$_3$, and Nb$_2$O$_5$ without seriously altering the colors and physical properties desired. In general, individual values of each addition will be held below 1%. MgO exerts a deleterious effect upon the colors produced (haze develops in transparent articles and the colors are not as intense in the opaque bodies), so no more than 0.5% can be tolerated and, preferably, the compositions will be essentially free from MgO.

The exact mechanism operating to produce the inventive coloration is not known with certainty but it is believed that the TiO$_2$ and Fe$_2$O$_3$ react with the other members of the "color package" and/or the above-cited transition metal oxides. Hence, as was disclosed in Ser. No. 451,283, the reaction deemed to take place between titanium and iron ions during the crystallization heat treatment, whereby the valence state of the titanium ions is reduced from +4 to +3, results in the development of an unattractive gray-brown coloration in the transparent glass-ceramic. Because of the relatively wide palette of colors which can be generated in the inventive glass-ceramics, it is believed apparent that a further and/or different reaction must be taking place during the crystallization heat treatment involving the other "color package" components and the transition metal oxides when present.

The presence of As$_2$O$_3$ in the composition leads to the development of more intense colors. The mechanism underlying this phenomenon is also not understood, but the inclusion of about 0.4–0.6% As$_2$O$_3$ is preferred to intensify the coloration generated.

U.S. application Ser. No. 451,282, filed concurrently to Ser. No. 451,284 by me under the title *Transparent Glass-Ceramics Especially Suitable for Use as Stove Windows*, discloses means by which glass-ceramic articles containing β-quartz solid solution as the predominant crystal phase and having compositions within two regimes of components can be made exceptionally resistant to attack by the atmosphere generated in a coal or wood burning stove.

In the first embodiment of that inventive method the precursor glass article is initially exposed to a H+ ion and Li+ ion exchange reaction utilizing the practice generally disclosed in U.S. Pat. No. 3,834,981, i.e., by immersion into a bath of strong mineral acid at temperatures of about 25°–320° C. to remove Li+ ions from the glass surface to a depth of at least 10 microns and preferably 25 microns. Thereafter, the glass article is heat treated to be crystallized in situ to a glass-ceramic containing β-quartz solid solution as the predominant crystal phase. The ion exchange reaction must be carried out on the parent glass article because crazing occurs when the glass-ceramic article is subjected to the H+ ion for Li+ ion exchange reaction.

In the second and preferred embodiment of that inventive method, the precursor glass article is first heat treated to be crystallized in situ to a glass-ceramic containing β-quartz solid solution as the predominant crystal phase. Thereafter, the glass-ceramic article is subjected to a K+ ion for Li+ ion exchange reaction by contact with a source of K+ ions (customarily a bath of a molten potassium salt) at temperatures between about 400°–800° C. for a period of time sufficient to cause the replacement of Li+ ions in the β-quartz solid solution crystals with K+ ions to a depth of at least 10 microns and preferably 25 microns into the surface of the article. A bath of molten KNO$_3$ is the suggested source of K+ ions at temperatures of 400°–600° C. and the eutectic 52% KCl-48% K$_2$SO$_4$ (by weight) as the source at 700°–800° C. The ion exchange must be carried out on the glass-ceramic because, when employed on the precursor glass and the glass then heat treated to be crystallized in situ, crazing always occurs.

Accordingly, where a colored window or other transparent element of a coal or wood burning stove is the desired product, either of the two method embodiments of Ser. No. 451,282 may be applied. For example:

(a) the glass article of the present inventive compositions may be subjected to a H+ for Li+ ion exchange via immersion into a bath of a strong mineral acid operating at about 25°–320° C. and thereafter crystallized in situ at about 750°–950° C., or (b) the glass-ceramic article of the present inventive compositions may be subjected to a K+ for Li+ ion exchange via contact with a source of K+ ions about 400°–800° C., the source customarily consisting of a bath of a molten potassium salt.

Glass-ceramic articles containing β-spodumene solid solution as the predominant crystal phase can also be made resistant to the fumes encountered in coal and wood burning stoves utilizing either of the two embodiments of the method disclosed in Ser. No. 451,282. Should such a product be desired, the precursor glass will be crystallized in situ at temperatures between 950°–1150° C., instead of the 750°–950° C. required in the crystallization of β-quartz solid solution.

RELATED APPLICATIONS

Ser. No. 451,282 filed concurrently to Ser. No. 451,284 by me under the title *Transparent Glass-Ceramic Especially Suitable for Use as Stove Windows*.

Ser. No. 451,283 filed concurrently to Ser. No. 451,284 by me under the title *Transparent Colorless Glass-Ceramics Especially Suitable for Use as Stove Windows*.

PRIOR ART

U.S. Pat. No. 3,788,865 described colored, transparent glass-ceramic articles containing β-eucryptite or β-spodumene as the predominant crystal phase prepared from precursor glasses having compositions consisting essentially, in weight percent, of:

| | | | |
|---|---|---|---|
| $SiO_2$ | 50–75 | $ZrO_2 + TiO_2 + SnO_2$ | Not over 10 |
| $Al_2O_3$ | 16–35 | Alkaline Earth Oxides | 0–4.5 |
| $Li_2O$ | 3–5.5 | $SiO_2 + Al_2O_3$ | 75–92 |
| $B_2O_3$ | 0–9 | ZnO | 0–4 |
| $ZrO_2$ | 0–5 | $Na_2O$ | 0–2 |
| $TiO_2$ | 0–10 | $F_2$ | 0–0.2 |
| $SnO_2$ | 0–5 | Colorants | 0.005–2 |
| $P_2O_5$ | 0–3 | | |

The colorants included $V_2O_5$, MnO, $Cr_2O_3$, $Fe_2O_3$, CuO, NiO, CuO, and ZnS.

As can be observed, $TiO_2$ and $Fe_2O_3$ are merely optional components and no mention is made of a reaction taking place between those two components and with at least two members of the group CaO, $CeO_2$, NiO, $SnO_2$, $V_2O_5$, and $WO_3$. Yet, that reaction comprises the nub of the instant invention. Furthermore, the patent has no description of the facility of $As_2O_3$ for enhancing the intensity of the colors developed.

U.S. Pat. No. 3,907,577 disclosed optionally-colored, translucent or opaque glass bodies having a surface compression layer produced via the in situ growth of β-spodumene and/or h-quartz crystals during a heat treatment of the glass bodies. Compositions for the glasses consisted essentially, in weight percent, of:

| | | | |
|---|---|---|---|
| $SiO_2$ | 52–70 | MgO | 0–5 |
| $Al_2O_3$ | 10–25 | ZnO | 0–7 |
| $B_2O_3$ | 0–8 | CaO | 0–10 |
| $P_2O_5$ | 0–10 | BaO | 0–12 |
| $Li_2O$ | 1–4 | $TiO_2$ | 0–1.2 |
| $Na_2O$ | 0–8 | $ZrO_2$ | 0–2.5 |
| $K_2O$ | 0–10 | $Fe_2O_3$ and/or NiO and/or CoO and/or $Cr_2O_3$ | 0–10 |

The patent has no discussion of the necessary reaction between $TiO_2$ and $Fe_2O_3$ with at least two members of the group CaO, $CeO_2$, NiO, $SnO_2$, $V_2O_5$, and $WO_3$. As a matter of fact, the $TiO_2$ content of the patented glasses is less than one-half of the minimum $TiO_2$ level demanded in the instant invention. The patent does not even suggest the capability of $As_2O_3$ for augmenting the intensity of the colors produced.

U.S. Pat. No. 3,962,514 was concerned with the formation of glass-ceramic bodies containing β-quartz and/or β-spodumene solid solutions as the predominant crystal phase and having an integral, colored surface layer of transition metal spinel crystals. The precursor glass bodies consisted essentially, in weight percent, of:

| | | | |
|---|---|---|---|
| $SiO_2$ | 55–80 | Transition Metal Oxides | 0.1–10 |
| $Al_2O_3$ | 14–35 | $TiO_2 + ZrO_2$ | 3–13 |
| $Li_2O$ | 0–5 | $ZrO_2$ | 0–10 |
| $TiO_2$ | 0–7 | F | 0–3 |

The transition metal oxides included 0–5% $MnO_2$, 0–5% $Fe_2O_3$, 0–3%, CoO, 0–2% CuO, 0–2% $Cr_2O_3$, 0–3% $V_2O_5$, and 0–10% NiO.

There is no indication of any reaction taking place between $TiO_2$ and $Fe_2O_3$ with at least two members of the group CaO, $CeO_2$, NiO, $SnO_2$, $V_2O_5$, and $WO_3$; and there is no reference made to the operability of $As_2O_3$ for intensifying the colors produced.

U.S. Pat. No. 4,007,048 was directed to preparing dark red, transparent glass-ceramic bodies containing h-quartz and/or h-spodumene solid solution as the predominant crystal phase and consisting essentially, in weight percent, of:

| | | | |
|---|---|---|---|
| $SiO_2$ | 64.00 ± 0.30 | ZnO | 1.50 ± 0.50 |
| $Al_2O_3$ | 21.30 ± 0.20 | $TiO_2$ | 2.30 ± 0.10 |
| $Li_2O$ | 3.50 ± 0.15 | $ZrO_2$ | 1.60 ± 0.10 |
| $Na_2O$ | 0.60 ± 0.15 | $MnO_2$ | 0.65 ± 0.15 |
| $K_2O$ | 0.50 ± 0.10 | $Fe_2O_3$ | 0.23 ± 0.03 |
| BaO | 2.50 ± 0.50 | CoO | 0.37 ± 0.05 |
| CaO | 0.20 ± 0.20 | NiO | 0.06 ± 0.02 |
| MgO | 0.10 ± 0.10 | $Sb_2O_3$ | 0.85 ± 0.15 |

Not only is the $TiO_2$ content below the minimum required in the instant invention, but also there is no statement of a reaction occurring between $TiO_2$ and $Fe_2O_3$ with at least two members of the group CaO, $CeO_2$, NiO, $SnO_2$, $V_2O_5$, and $WO_3$. Nor is there even an allusion to the efficacy of $As_2O_3$ for improving the colors generated.

U.S. Pat. No. 4,042,362 was directed to a two-step process for very rapidly converting molten glass into a glass-ceramic body. Whereas the process is not limited to specified compositions, several of the working examples produced glass-ceramic bodies containing β-quartz and/or β-spodumene solid solution as the predominant crystal phase. Colored articles are nowhere referred to and in those examples $Fe_2O_3$ is merely an optional ingredient. There is no discussion of any reaction taking place between $TiO_2$ and $Fe_2O_3$ with at least two members of the group CaO, $CeO_2$, NiO, $SnO_2$, $V_2O_5$, and $WO_3$, nor any account of the effectiveness of $As_2O_3$ in increasing the intensity of the colors developed.

U.S. Pat. No. 4,084,974 was drawn to the preparation of light absorbing glass-ceramic bodies manifesting a blue-to-black coloration and containing β-quartz and β-spodumene solid solution as the predominant crystal phase from base compositions in the $Li_2O$-$Al_2O_3$-$SiO_2$ system nucleated with $TiO_2$. $Fe_2O_3$ is nowhere mentioned so, self-evidently, there was no suggestion of a reaction occurring between $TiO_2$ and $Fe_2O_3$ with at least two members of the group CaO, $CeO_2$, NiO, $SnO_2$, $V_2O_5$, and $WO_3$. $As_2O_3$ appears in the working examples but there is no statement of its utility in enhancing color intensity.

U.S. Pat. No. 4,211,820 disclosed transparent glass-ceramic articles exhibiting a warm brown coloration and containing β-quartz solid solution as the predominant crystal phase with, optionally, a minor amount of β-spodumene solid solution. The compositions therefor consisted essentially, in weight percent, of:

| | | | |
|---|---|---|---|
| $Li_2O$ | 2.5–4.5 | $SiO_2$ | 66.5–68 |
| MgO | 1–2 | $TiO_2$ | 4–5 |
| ZnO | 1–2 | $V_2O_5$ | 0.02–0.2 |
| $Al_2O_3$ | 19.5–21 | | |

$V_2O_5$ was stated to impart the desired color.

$Fe_2O_3$ was not intentionally included in the composition but is merely present as an impurity in several of the working examples. There is no discussion of any reaction taking place between $TiO_2$ and $Fe_2O_3$ with at least two members of the group CaO, $CeO_2$, NiO, $SnO_2$, $V_2O_5$, and $WO_3$ to yield a wide spectrum of colors. The patented products exhibited a brown coloration only. MgO is a required component of the patented compositions whereas, because of its adverse effect upon the coloration of the instant inventive products, its essential absence is greatly preferred. $As_2O_5$ is referred to only as a fining agent; there is no indication of its faculty for enhancing the intensity of a color produced.

DESCRIPTION OF PREFERRED EMBODIMENTS

Table I records a group of exemplary compositions, expressed in terms of parts by weight on the oxide basis, illustrating the compositional parameters of the inventive products. Because the sum of the individual components totals or closely approximates 100, for all practical purposes the values reported may be deemed to represent weight percent. The actual ingredients employed in preparing the batch may comprise materials, either the oxides or other compounds which, when melted together, will be converted into the desired oxide in the proper proportions.

The batch ingredients were compounded, ballmilled together to aid in obtaining a homogeneous melt, the batches deposited into platinum crucibles, lids placed upon the crucibles, and the crucibles introduced into a furnace operating at about 1550°–1600° C. The batches were melted for about 16 hours with stirring, canes having a diameter of about 0.25" were hand-drawn from each melt and the remainder of each melt poured into a steel mold to form a glass slab having dimensions of about 6"×6"×0.5". The slabs were transferred immediately to an annealer operating at about 650°–700° C.

$As_2O_3$ is present to perform its customary function of a fining agent as well as to promote the development of more intense colors.

TABLE I

| | 1 | 2 | 3 | 4 | 5 | 6 | 7 | 8 | 9 |
|---|---|---|---|---|---|---|---|---|---|
| $SiO_2$ | 67.1 | 67.3 | 66.0 | 67.6 | 67.4 | 66.3 | 68.8 | 68.4 | 66.8 |
| $Al_2O_3$ | 20.0 | 20.0 | 20.0 | 20.0 | 20.0 | 21.0 | 19.0 | 19.0 | 19.0 |
| $Li_2O$ | 3.8 | 3.8 | 3.5 | 3.8 | 4.0 | 3.6 | 3.8 | 4.0 | 3.8 |
| $Na_2O$ | 0.3 | 0.3 | 0.4 | 0.3 | 0.3 | 0.1 | 0.3 | 0.3 | 0.3 |
| $K_2O$ | 0.5 | 0.5 | 0.6 | 0.3 | 0.3 | 0.1 | 0.3 | 0.3 | 0.3 |
| ZnO | 0.8 | 0.8 | 0.8 | 0.8 | 0.8 | 1.2 | 0.8 | 0.8 | 1.2 |
| BaO | 0.8 | 0.8 | 0.8 | 1.0 | 0.8 | 2.5 | 1.0 | 0.8 | 2.5 |
| $TiO_2$ | 3.2 | 3.4 | 4.6 | 3.4 | 3.4 | 3.0 | 3.4 | 3.4 | 3.3 |
| $ZrO_2$ | 1.6 | 1.6 | 1.6 | 1.6 | 1.6 | 1.6 | 1.6 | 1.6 | 1.6 |
| $As_2O_3$ | 0.6 | 0.6 | 0.6 | 0.6 | 0.6 | 0.4 | 0.6 | 0.6 | 0.6 |
| $Fe_2O_3$ | 0.15 | 0.15 | 0.15 | 0.15 | 0.1 | 0.15 | 0.15 | 0.1 | 0.15 |
| $V_2O_5$ | 0.2 | 0.2 | 0.2 | 0.2 | 0.2 | 0.2 | 0.2 | 0.2 | 0.2 |
| $CeO_2$ | 1.0 | 0.3 | 0.8 | 0.2 | 0.3 | 0.1 | — | 0.3 | — |
| CaO | — | 0.3 | — | 0.1 | 0.3 | 0.3 | — | 0.3 | — |
| $SnO_2$ | — | — | — | — | — | — | 0.1 | — | 0.1 |

| | 10 | 11 | 12 | 13 | 14 | 15 | 16 | 17 | 18 |
|---|---|---|---|---|---|---|---|---|---|
| $SiO_2$ | 67.4 | 67.1 | 68.1 | 63.9 | 64.6 | 66.4 | 66.4 | 67.3 | 66.1 |
| $Al_2O_3$ | 19.0 | 19.0 | 18.0 | 20.0 | 20.0 | 19.0 | 19.0 | 19.0 | 19.0 |
| $Li_2O$ | 3.0 | 3.5 | 3.5 | 3.5 | 3.5 | 3.8 | 3.8 | 3.8 | 3.5 |
| $Na_2O$ | 0.3 | 0.3 | 0.3 | 0.3 | 0.3 | 0.3 | 0.3 | 0.3 | 0.3 |
| $K_2O$ | 0.3 | 0.3 | 0.3 | 0.3 | 0.3 | 0.3 | 0.3 | 0.3 | 0.3 |
| ZnO | 1.2 | 1.2 | 1.2 | 2.0 | 1.2 | 1.2 | 1.2 | 1.2 | 2.0 |
| BaO | 2.5 | 2.5 | 2.5 | 2.5 | 4.0 | 2.5 | 2.5 | 2.5 | 2.5 |
| $TiO_2$ | 3.3 | 3.3 | 3.3 | 3.3 | 3.3 | 3.3 | 3.3 | 3.3 | 3.3 |
| $ZrO_2$ | 1.6 | 1.6 | 1.6 | 1.6 | 1.6 | 1.6 | 1.6 | 1.6 | 1.6 |
| $As_2O_3$ | 0.8 | 0.8 | 0.8 | 0.8 | 0.8 | 0.8 | 0.8 | 0.8 | 0.8 |
| $Fe_2O_3$ | 0.15 | 0.15 | 0.15 | 0.15 | 0.15 | 0.15 | 0.06 | 0.15 | 0.15 |
| $V_2O_5$ | 0.2 | 0.2 | 0.2 | 0.2 | 0.2 | 0.2 | 0.2 | 0.2 | 0.2 |
| $CeO_2$ | 0.2 | — | — | 0.2 | — | 0.2 | — | — | 0.2 |
| CaO | 0.1 | — | — | 0.1 | — | 0.1 | — | — | 0.1 |
| $SnO_2$ | — | 0.1 | 0.1 | — | 0.1 | — | 0.1 | 0.1 | — |

| | 19 | 20 | 21 | 22 | 23 | 24 | 25 | 26 |
|---|---|---|---|---|---|---|---|---|
| $SiO_2$ | 66.0 | 66.9 | 64.9 | 64.3 | 65.3 | 66.0 | 66.0 | 67.2 |
| $Al_2O_3$ | 19.0 | 19.0 | 20.0 | 20.0 | 20.0 | 20.0 | 20.0 | 20.0 |
| $Li_2O$ | 3.5 | 3.5 | 3.5 | 3.5 | 3.5 | 3.5 | 3.5 | 3.5 |
| $Na_2O$ | 0.3 | 0.3 | 0.4 | 0.4 | 0.4 | 0.4 | 0.3 | 0.4 |
| $K_2O$ | 0.3 | 0.3 | 0.6 | 0.6 | 0.6 | 0.6 | 0.4 | 0.6 |
| ZnO | 2.0 | 1.2 | 0.8 | 0.8 | 0.8 | 0.8 | 0.8 | 0.8 |
| BaO | 2.5 | 2.5 | 0.8 | 0.8 | 0.8 | 0.8 | 0.8 | 0.8 |
| $TiO_2$ | 3.3 | 3.3 | 4.6 | 4.6 | 4.6 | 4.6 | 5.0 | 2.8 |
| $ZrO_2$ | 1.6 | 1.6 | 1.6 | 1.6 | 1.6 | 1.6 | 1.6 | 1.6 |
| $As_2O_3$ | 0.8 | 0.8 | 0.6 | 0.6 | 0.6 | 0.6 | 0.6 | 0.6 |
| $Fe_2O_3$ | 0.15 | 0.15 | 0.15 | 0.15 | 0.15 | 0.15 | 0.1 | 0.1 |
| $V_2O_5$ | 0.2 | 0.2 | 0.1 | 0.1 | 0.1 | 0.2 | 0.1 | — |
| $CeO_2$ | — | 0.2 | 2.0 | 2.0 | 1.6 | 0.8 | — | — |
| CaO | — | — | — | 0.6 | — | — | — | — |
| $SnO_2$ | 0.1 | — | — | — | — | — | 0.8 | — |
| NiO | — | — | — | — | — | — | — | 0.8 |
| $WO_3$ | — | — | — | — | — | — | — | 0.8 |

TABLE II recites the heat treatment schedules applied to the specimens of TABLE I in an electrically-heated furnace, a visual description of the crystallized glass-ceramic body, the predominant crystal phase present as identified through X-ray diffraction analysis, and the coefficient of thermal expansion (25°–700° C.) of the glass-ceramic body, where determined, utilizing measuring techniques conventional in the art. In each instance, the parent glass was heated to the first temperature level at about 100° C./hour, held at the first level to induce nucleation, the temperature raised to the second level at about 100° C./hour, held thereat to grow crystals on the nuclei, and then the crystallized body cooled to room temperature at furnace rate.

TABLE II

| Example | Heat Treatment (°C.) | Visual Appearance | Crystal Phase | Coef. Exp. ($\times 10^{-7}$/°C.) |
|---|---|---|---|---|
| 1 | 780 for 1 hr. 900 for 1 hr. | Glossy, black, transparent | β-Quartz Solid Solution | −3 |
| 1 | 780 for 1 hr. 1100 for 1 hr. | Glossy, gray, opaque | β-Spodumene Solid Solution | — |
| 2 | 780 for 1 hr. 900 for 1 hr. | Glossy, black, translucent | β-Quartz Solid Solution | −1.9 |
| 2 | 780 for 1 hr. 1100 for 1 hr. | Glossy, brown-beige, opaque | β-Spodumene Solid Solution | 10.5 |
| 3 | 780 for 1 hr. 900 for 1 hr. | Brown-black, translucent | β-Quartz Solid Solution | −1.5 |
| 3 | 780 for 1 hr. 1100 for 1 hr. | Glossy, gray-beige, opaque | β-Spodumene Solid Solution | 13.3 |
| 4 | 780 for 1 hr. 900 for 1 hr. | Black, transparent | β-Quartz Solid Solution | −4.9 |
| 4 | 780 for 1 hr. 1100 for 1 hr. | Glossy, gray-beige, opaque | β-Spodumene Solid Solution | 9.8 |
| 5 | 780 for 1 hr. | Black, | β-Quartz | −6.8 |

TABLE II-continued

| Example | Heat Treatment (°C.) | Visual Appearance | Crystal Phase | Coef. Exp. ($\times 10^{-7}$/°C.) |
|---|---|---|---|---|
| | 900 for 1 hr. | transparent | Solid Solution | |
| 5 | 780 for 1 hr. 1100 for 1 hr. | Glossy, gray-beige, opaque | β-Spodumene Solid Solution | 8.9 |
| 6 | 780 for 1 hr. 900 for 1 hr. | Black, translucent | β-Quartz Solid Solution | −5.1 |
| 6 | 780 for 1 hr. 1100 for 1 hr. | Glossy, gray-beige, opaque | β-Spodumene Solid Solution | 10.0 |
| 7 | 780 for 1 hr. 900 for 1 hr. | Black, translucent | β-Quartz Solid Solution | −4.0 |
| 7 | 780 for 1 hr. 1100 for 1 hr. | Glossy, gray-beige, opaque | β-Spodumene Solid Solution | 10.3 |
| 8 | 780 for 1 hr. 900 for 1 hr. | Black, translucent | β-Quartz Solid Solution | −5.3 |
| 8 | 780 for 1 hr. 1100 for 1 hr. | Glossy, gray-beige, opaque | β-Spodumene Solid Solution | 9.1 |
| 9 | 780 for 1 hr. 900 for 1 hr. | Black, translucent | β-Quartz Solid Solution | −3.0 |
| 9 | 780 for 1 hr. 1100 for 1 hr. | Glossy, almond-beige, opaque | β-Spodumene Solid Solution | 11.0 |
| 10 | 780 for 1 hr. 900 for 1 hr. | Black, translucent | β-Quartz Solid Solution | 3.3 |
| 10 | 780 for 1 hr. 1100 for 1 hr. | Glossy gray, opaque | β-Spodumene Solid Solution | 15.2 |
| 11 | 780 for 1 hr. 900 for 1 hr. | Black, translucent | β-Quartz Solid Solution | 0.7 |
| 11 | 780 for 1 hr. 1100 for 1 hr. | Glossy, yellow-almond, opaque | β-Spodumene Solid Solution | 14.3 |
| 12 | 780 for 1 hr. 900 for 1 hr. | Black, translucent | β-Quartz Solid Solution | −2.7 |
| 12 | 780 for 1 hr. 1100 for 1 hr. | Glossy, almond, opaque | β-Spodumene Solid Solution | 9.7 |
| 13 | 780 for 1 hr. 900 for 1 hr. | Black, translucent | β-Quartz Solid Solution | −1.9 |
| 13 | 780 for 1 hr. 1100 for 1 hr. | Glossy, gray-beige, opaque | β-Spodumene Solid Solution | — |
| 14 | 780 for 1 hr. 900 for 1 hr. | Black, translucent | β-Quartz Solid Solution | 1.4 |
| 14 | 780 for 1 hr. 1100 for 1 hr. | Glossy, beige, opaque | β-Spodumene Solid Solution | 15.5 |
| 15 | 780 for 1 hr. 900 for 1 hr. | Black, translucent | β-Quartz Solid Solution | −1.6 |
| 15 | 780 for 1 hr. 1100 for 1 hr. | Glossy, almond, opaque | β-Spodumene Solid Solution | 12.8 |
| 16 | 780 for 1 hr. 900 for 1 hr. | Black, translucent | β-Quartz Solid Solution | −1.2 |
| 16 | 780 for 1 hr. 1100 for 1 hr. | Glossy, gray, opaque | β-Spodumene Solid Solution | 4.8 |
| 17 | 780 for 1 hr. 900 for 1 hr. | Black, translucent | β-Quartz Solid Solution | −2.5 |
| 17 | 780 for 1 hr. 1100 for 1 hr. | Glossy, gray-beige, opaque | β-Spodumene Solid Solution | 11.9 |
| 18 | 780 for 1 hr. 900 for 1 hr. | Black, translucent | β-Quartz Solid Solution | −1.1 |
| 18 | 780 for 1 hr. 1100 for 1 hr. | Glossy, almond, opaque | β-Spodumene Solid Solution | 13.5 |
| 19 | 780 for 1 hr. 900 for 1 hr. | Black, translucent | β-Quartz Solid Solution | −2.8 |
| 19 | 780 for 1 hr. 1100 for 1 hr. | Glossy, gray-beige, opaque | β-Spodumene Solid Solution | 11.9 |
| 20 | 780 for 1 hr. 900 for 1 hr. | Black, translucent | β-Quartz Solid Solution | −2.4 |
| 20 | 780 for 1 hr. 1100 for 1 hr. | Glossy, almond, opaque | β-Spodumene Solid Solution | 11.0 |
| 21 | 780 for 1 hr. 900 for 1 hr. | Black-brown, translucent | β-Quartz Solid Solution | 0.9 |
| 21 | 780 for 1 hr. 1100 for 1 hr. | Glossy, beige, opaque | β-Spodumene Solid Solution | 11.7 |
| 22 | 780 for 1 hr. 900 for 1 hr. | Black-brown, translucent | β-Quartz Solid Solution | — |
| 22 | 780 for 1 hr. 1100 for 1 hr. | Glossy, yellow, opaque | β-Spodumene Solid Solution | — |
| 23 | 780 for 1 hr. 900 for 1 hr. | Black-brown, translucent | β-Quartz Solid Solution | — |
| 23 | 780 for 1 hr. 1100 for 1 hr. | Glossy, beige, opaque | β-Spodumene Solid Solution | — |
| 24 | 780 for 1 hr. 900 for 1 hr. | Black-brown, translucent | β-Quartz Solid Solution | −1.5 |
| 24 | 780 for 1 hr. 1100 for 1 hr. | Glossy, gray-beige, opaque | β-Spodumene Solid Solution | 13.3 |
| 25 | 780 for 1 hr. 900 for 1 hr. | Black, opaque | β-Quartz Solid Solution | −0.5 |
| 25 | 780 for 1 hr. 1100 for 1 hr. | Glossy, blue, opaque | β-Spodumene Solid Solution | 12.8 |
| 26 | 780 for 1 hr. 900 for 1 hr. | Ruby, transparent | β-Quartz Solid Solution | — |
| 26 | 780 for 1 hr. 1100 for 1 hr. | Glossy, light blue, opaque | β-Spodumene Solid Solution | 10.4 |

TABLE III records a summary of the general trends in colors and optical transmissions produced in the inventive glass-ceramic bodies as a function of compositional variations. It must be emphasized that the descriptions provided represent trends only and assume precursor glasses having base compositions within the above-cited regimes. As reported, "higher" values reflect amounts of a component at the higher end of the operable range thereof and "lower" values the other extreme of the range. The "lower" values of the "color package" ingredients $V_2O_5$, $CeO_2$ CaO, and $SnO_2$ signify the virtual absence thereof.

TABLE III

| Component | Beta-Quartz Solid Solution | Beta-Spodumene Solid Solution |
|---|---|---|
| High $Al_2O_3$ | Haze develops | Greater gray color, thermal expansion rises |

TABLE III-continued

| Component | Beta-Quartz Solid Solution | Beta-Spodumene Solid Solution |
|---|---|---|
| Low $Al_2O_3$ | Translucency develops, blacker color | Greater yellow-beige color |
| High $Li_2O$ | Blacker color, opacity develops | Greater gray color |
| Low $Li_2O$ | Greater transparency, browner color | Greater yellow color |
| High ZnO | Blacker color, opacity develops | Greater beige color |
| Low ZnO | Browner color, greater transparency | Greater gray color |
| High BaO | Blacker color, opacity develops | Greater beige color |
| Low BaO | Greater transparency, browner color | Greater grayer color |
| High $TiO_2$ | Blacker color, opacity develops | Greater beige color, thermal expansion rises |
| Low $TiO_2$ | Greater transparency, browner color | Greater gray color |
| High $ZrO_2$ | Browner color | Greater beige color |
| Low $ZrO_2$ | Greater gray color | Greater gray color, satin surface develops |
| High $As_2O_3$ | Blacker color, opacity develops | Greater beige color |
| Low $As_2O_3$ | Greater transparency, greater amber color | Greater gray color |
| High $Na_2O$ | Slightly greater brown color | Slightly greater beige color |
| Low $Na_2O$ | Slightly greater black color | Slightly greater gray color |
| High $K_2O$ | Slightly greater brown color | Slightly greater beige color |
| Low $K_2O$ | Slightly greater black color | Slightly greater gray color |
| High $Fe_2O_3$ | Blacker color, translucency develops | Greater beige color |
| Low $Fe_2O_3$ | Greater transparency, browner color | Greater gray color, thermal expansion falls |
| High $V_2O_5$ | Blacker color, translucency develops | Greater black-gray color |
| Low $V_2O_5$ | Greater transparency, browner color | Greater beige color |
| High $CeO_2$ | Blacker color, translucency develops | Greater beige color |
| Low $CeO_2$ | Greater transparency, browner color | Greater gray color |
| High CaO | Blacker color, translucency develops | Greater beige-yellow color |
| Low CaO | Greater transparency, browner color | Greater gray color |
| High $SnO_2$ | Blacker color, translucency develops | Greater gray color |
| Low $SnO_2$ | Greater transparency, brown color | Greater beige color |

I claim:

1. A transparent, translucent, or opaque glass-ceramic article exhibiting colors ranging from black to brown to red and containing β-quartz solid solution as the predominant crystal phase, said glass-ceramic article being essentially free from MgO and consisting essentially, expressed in terms of weight percent on the oxide basis, of:

| | | | |
|---|---|---|---|
| $SiO_2$ | 63.5–69 | BaO | 0–5 |
| $Al_2O_3$ | 15–25 | $TiO_2$ | >2.5–6 |
| $Li_2O$ | 2.5–4 | $ZrO_2$ | 0–2 |
| $Na_2O$ | 0.1–0.6 | $As_2O_3$ | 0.4–0.8 |
| $K_2O$ | 0.1–0.6 | $Fe_2O_3$ | 0.05–0.2 |
| ZnO | 0–2 | | | and 0.3–3% total of at least two oxides in the indicated proportions selected from the group of 0–2% CaO, 0–3% $CeO_2$, 0–1% NiO, 0–1.5% $SnO_2$, 0–0.3% $V_2O_5$, and 0–1% $WO_3$.

2. A glass-ceramic article according to claim 1 also containing up to 3% total of at least one oxide selected from the group of $B_2O_3$, $Cr_2O_3$, $Cs_2O$, $Cu_2O$, $La_2O_3$, MnO, and $Nb_2O_5$, wherein the individual value of each oxide is below 1%.

3. An opaque glass-ceramic article exhibiting colors ranging from gray to brown to almond to beige to yellow to blue and containing β-spodumene as the predominant crystal phase, said glass-ceramic article being essentially free from MgO and consisting essentially, expressed in terms of weight percent on the oxide basis, of:

| | | | |
|---|---|---|---|
| $SiO_2$ | 63.5–69 | BaO | 0–5 |
| $Al_2O_3$ | 15–25 | $TiO_2$ | >2.5–6 |
| $Li_2O$ | 2.5–4 | $ZrO_2$ | 0–2 |
| $Na_2O$ | 0.1–0.6 | $As_2O_3$ | 0.4–0.8 |
| $K_2O$ | 0.1–0.6 | $Fe_2O_3$ | 0.05–0.2 |
| ZnO | 0–2 | | | and 0.3–3% total of at least two oxides in the indicated proportions selected from the group of 0–2% CaO, 0–3% $CeO_2$, 0–1% NiO, 0–1.5% $SnO_2$, 0–0.3% $V_2O_5$, and 0–1% $WO_3$.

4. A glass-ceramic article according to claim 3 also containing up to 3% total of at least one oxide selected from the group of $B_2O_3$, $Cr_2O_3$, $Cs_2O$, $Cu_2O$, $La_2O_3$, MnO, and $Nb_2O_5$, wherein the individual value of each oxide is below 1%.

* * * * *